United States Patent [19]

Hogg

[11] 3,751,689

[45] Aug. 7, 1973

[54] ELECTRONIC LATCH CIRCUIT

[75] Inventor: William P. Hogg, Greensburg, Pa.

[73] Assignee: Westinghouse Electric Corporation, Pittsburgh, Pa.

[22] Filed: July 22, 1971

[21] Appl. No.: 164,997

[52] U.S. Cl. .................. 307/246, 307/208, 307/218, 328/110, 328/120, 328/151

[51] Int. Cl. .... H03k 19/24, H03k 5/18, H03k 17/26

[58] Field of Search .................... 307/208, 215, 218, 307/246; 328/120, 151, 110

[56] References Cited

UNITED STATES PATENTS

| | | | |
|---|---|---|---|
| 3,375,501 | 3/1968 | McCutcheon et al. | 328/151 X |
| 3,205,447 | 9/1965 | Richards | 307/215 X |
| 3,461,404 | 8/1969 | Kutschbach | 307/218 X |
| 3,428,825 | 2/1969 | Martin | 307/218 |
| 3,178,587 | 4/1965 | Meyer et al. | 307/218 |
| 2,835,828 | 5/1958 | Vogelsong | 307/208 |
| 3,586,878 | 6/1971 | Maxham | 328/151 X |
| 3,493,875 | 2/1970 | Stuckert | 328/151 |

*Primary Examiner*—John W. Huckert
*Assistant Examiner*—L. N. Anagnos
*Attorney*—F. H. Henson et al.

[57] ABSTRACT

An AND gate has a signal input to which a periodic signal is applied and a control input to which a control pulse is momentarily applied. In response to the concurrent presence of the periodic signal and the control pulse at the respective inputs, a periodic signal is provided at the output of the AND gate. The periodic signal provided at the output of the AND gate is detected for charging a charge storage means to a voltage level of substantially the same level as the voltage level of the control pulse. This latter voltage level is fed back to the control input of the gate, and in response thereto, the gate continues to provide the periodic signal at its output after the control pulse terminates and until the periodic input signal to the gate is interrupted. The periodic output signal from the gate is amplified in an amplifier and provided as the output signal of the latch circuit. In response to the sensing of the AND gate no longer providing the periodic output signal, the charge storage means then rapidly discharges through the amplifier.

12 Claims, 3 Drawing Figures

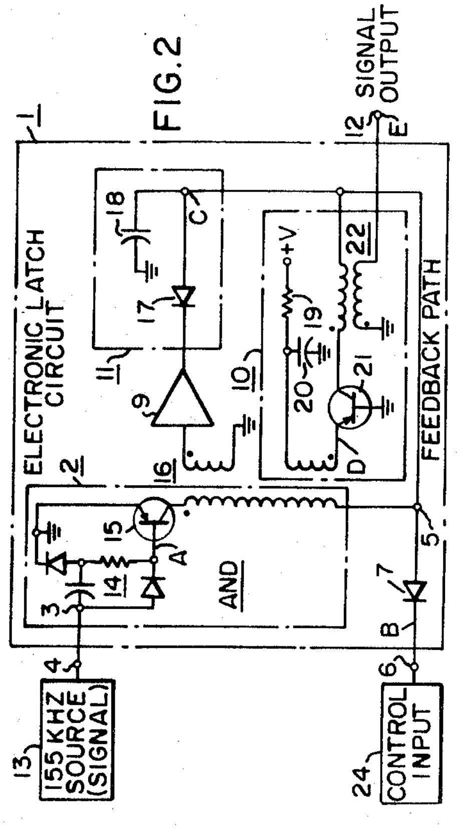
ELECTRONIC LATCH CIRCUIT
155 KHZ SOURCE (SIGNAL)
CONTROL INPUT
SIGNAL OUTPUT
FEEDBACK PATH
AND
+V
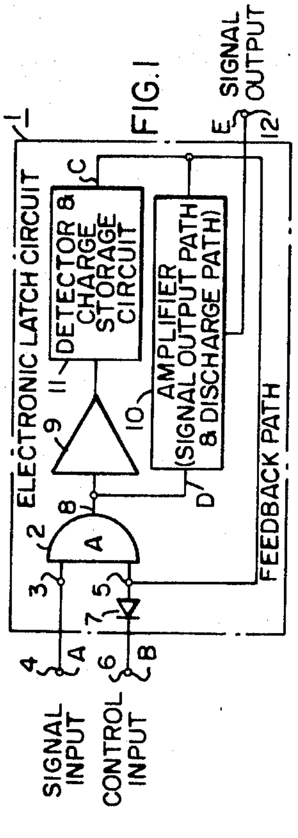
ELECTRONIC LATCH CIRCUIT
SIGNAL INPUT
CONTROL INPUT
DETECTOR & CHARGE STORAGE CIRCUIT
AMPLIFIER (SIGNAL OUTPUT PATH & DISCHARGE PATH)
SIGNAL OUTPUT
FEEDBACK PATH
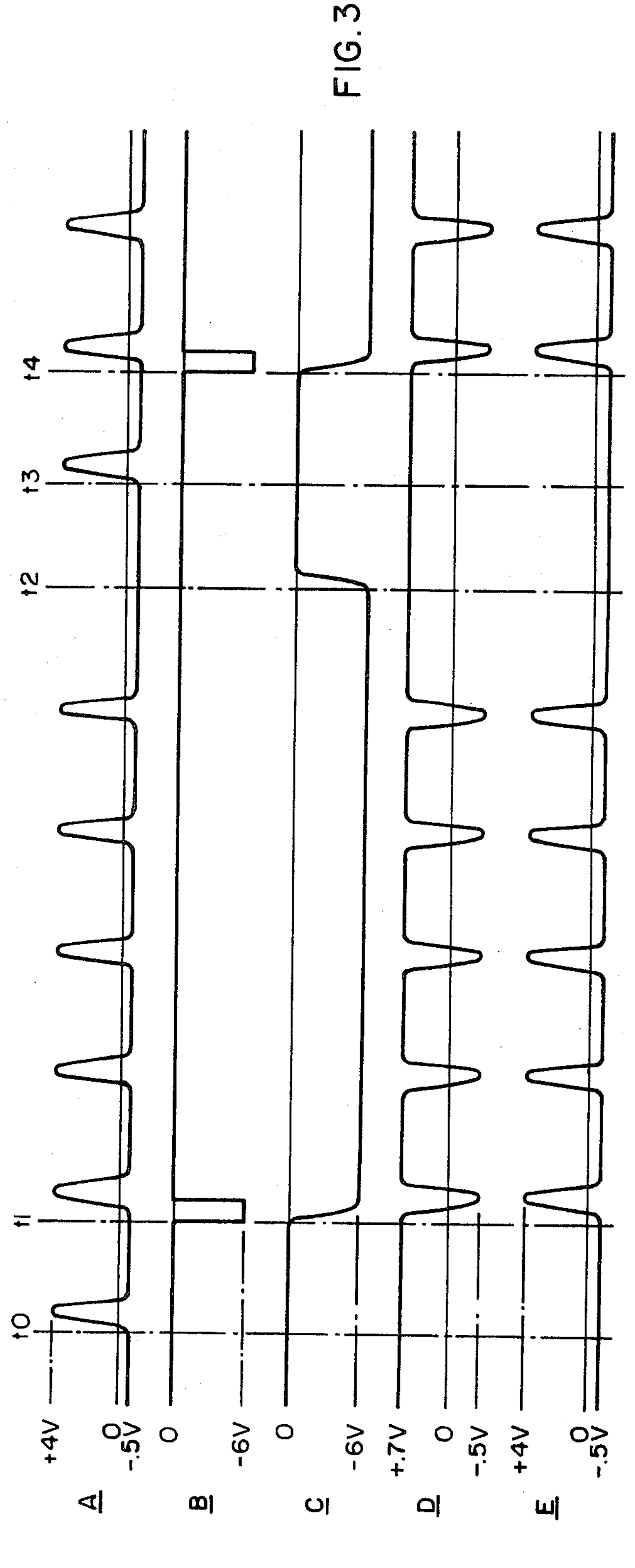
A
B
C
D
E
+4V
0
-.5V
-6V
+.7V
t0
t1
t2
t3
t4

ELECTRONIC LATCH CIRCUIT

CROSS REFERENCE TO RELATED APPLICATION:

Reference is made to U.S. Pat. No. 3,600,604, Application Ser. No. 780,662, filed Dec. 3, 1968 on behalf of George M. Thorne-Booth and entitled "Fail Safe Logic Gates", which is assigned to the assignee of the present invention.

SUMMARY OF THE INVENTION

In accordance with the teachings of the present invention, an electronic latch circuit includes means which are responsive to first and second input signals for providing an output signal. A charge storage means charges to a predetermined signal level in response to the provision of the output signal for providing one of the first and second input signals. There is also included means for providing one of an output signal path in response to the provision of the output signal and a discharge path for the charge storage means in response to the sensing of the absence of the output signal.

BACKGROUND OF THE INVENTION

In modern vehicle control systems the trend is to utilize fail-safe electronic control circuits in place of prior art relay-type control circuits, the reason being that the electronic control circuits require less power, have no moving parts, and operate at higher speeds than do the relay circuits.

In accordance with the teachings of the present invention, an electronic latch circuit is provided which performs the same logic function as the "stick relay" which is known in the prior art.

DESCRIPTION OF THE DRAWINGS

FIG. 1 is a block diagram representation of a latch circuit embodying the teachings of the present invention.

FIG. 2 is a schematic diagram representation of a latch circuit embodying the teachings of the present invention.

FIG. 3 is a wave shape relationship diagram useful in the understanding of FIGS. 1 and 2.

DETAILED DESCRIPTION OF THE PREFERRED EMBODIMENT

In FIG. 1 there is illustrated a block diagram of an electronic latch circuit 1 which embodies the teachings of the present invention. The letters A through E found on FIG. 1 are indicative of the circuit points at which the waveshapes A through E, respectively, as shown in FIG. 3, are present in the circuit of FIG. 1. It is to be appreciated that all of the circuit components illustrated in FIGS. 1 and 2 may be of the fail-safe type, having unidirectional failure modes. An AND gate 2 receives a periodic signal at a first input terminal 3 by way of the signal input terminal 4 of the latch. A second input terminal 5 of the AND gate is connected to the control input terminal 6 of the latch by way of a unidirectional current means such as a diode 7. The output 8 of the AND gate 2 is connected to an amplifier 9 and an amplifier 10. The latter amplifier functions as a signal output path for the AND gate, and a discharge path for a detector and charge storage circuit 11 which receives an input signal from the amplifier 9, and in turn has its output connected to the amplifier 10 and to the input terminal 5 of the AND gate by way of a feedback path. The signal output terminal 12 of the latch circuit is connected to the signal output of the amplifier 10. The AND gate 2 may in practice be a fail-safe AND gate such as the AND gate which is described in detail in the previously referenced U.S. Patent 3,600,604. A periodic signal (as shown at wave shape A of FIG. 3) is applied to the signal input terminal 4 of the latch circuit 1 at a time $t0$ (as shown in FIG. 3) and in turn to the input terminal 3 of the AND gate 2. At this time, however, the control input signal (see waveshape B of FIG. 3) is at a zero voltage level, and there is therefore no enabling signal applied to the input terminal 5 of the AND gate 2, and the AND gate 2 therefore is disabled. Since there is no signal provided at the output 8 of the AND gate 2 at this time, the amplifier 9 provides no output signal, and the detector and charge storage circuit 11 in turn essentially provides a zero volt level at its output. This latter zero volt level is fed back to the input terminal 5 of the AND gate 2 and to the amplifier 10. Since the amplifier 10 is receiving no signal input from the AND gate 2, there is no signal output provided at the signal output terminal 12 of the latch. The amplifier 10 operates in a class A mode, so it is therefore drawing a finite amount of current at this time and provides a discharge path for the detector and the charge storage circuit 11.

At a time t1 (see waveshape B of FIG. 3) the control signal goes to a negative voltage level on the order of minus six volts, and this signal is applied to the control input terminal 6 of the latch, and in turn to the input terminal 5 of the AND gate 2 by way of the conducting diode 7. The AND gate 2, therefore, becomes enabled as both input signals are concurrently present, and in response thereto provides a periodic signal at its output. The latter output signal is amplifier by the amplifier 9 and in turn detected by the circuit 11, which stores a voltage level on the order of minus six volts in response to the signal output provided by the amplifier 9. This output signal from the circuit 11 (see waveshape C of FIG. 3) is in turn fed back to the input terminal 5 of the AND gate 2 and maintains the AND gate enabled so long as the periodic signal is concurrently applied to the signal input terminal 4 of the latch. A periodic signal as shown at waveshape D of FIG. 3 is provided to the input of the amplifier 10 from the output of the enabled AND gate 2. As was previously mentioned, the amplifier 10 operates in a class A mode, and is conductive in the absence of the latter input signal; also, the amplifier 10 is conductive so long as the provided input signal is above a predetermined negative level, for example −.5 volts. This will be explained in detail in conjunction with the explanation of the detailed schematic circuit of FIG. 2. For now, it is to be assumed that so long as the input signal is above this predetermined negative level, the amplifier 10 remains conductive and functions as a discharge path for the circuit 11. When, however, the input signal reaches the latter negative level, such as when the first pulse after the time t1 reaches the level on the order of −.5 volts, the amplifier 10 becomes nonconductive and the detector circuit 11 does not have a discharge path. At this time, the amplifier 10 functions as an output signal path and provides an output signal to the signal output terminal 12 of the latch 2 (see waveshape E of FIG. 3). The time interval between the negative pulses applied to the input of amplifier 9, as shown in the waveshape D of FIG. 3, are chosen to be of a duration such that the circuit 11 may only discharge a relatively small amount and is immediately recharged to the negative 6 volt level by the signal input provided by the amplifier 9. At a time t2 the signal input (see waveshape A of FIG. 3) is absent an input pulse and the AND gate 2 in turn is disabled and therefore provides no output signal. The amplifier 9 in turn no longer provides an input signal to the circuit 11, and the circuit 11 discharges at a relatively high rate through the discharge path provided by the conducting amplifier 10 (see waveshape C of FIG. 3).

At a time *t*3, the signal input to the latch (see waveshape A of FIG. 3) once again provides input pulses to the AND gate. The control input signal, however, is at a zero volt level (see waveshape B of FIG. 3) and the AND gate 2 therefor remains disabled, and in turn there is no output signal provided at the output 12 of the latch since the amplifier 10 is not receiving an input signal from the AND gate 2. At a time *t*4 the control input terminal 6 of the latch circuit 1 receives a negative pulse on the order of −6 volts (see waveshape B of FIG. 3). Since the AND gate is concurrently receiving a periodic signal input at its terminal 4 (see waveshape A of FIG. 3), the AND gate provides a periodic signal at its output, and in response thereto, the amplifier 9 provides a periodic signal to the input of the detector and charge storage circuit 11, causing the latter circuit to provide a −6 volt level to the input terminal 5 of the AND gate 2 (see waveshape C of FIG. 3). The amplifier 10 is also receiving a periodic input signal at this time (see waveshape D of FIG. 3) and in response thereto a periodic signal is provided at the output terminal 12 of the latch (see waveshape E of FIG. 3). The amplifier 10, therefore, functions as an output signal path at this time. The circuit, therefore, continues to provide a periodic signal at the output terminal 12 so long as the signal input at the input terminal 4 of the latch is not interrupted, because the circuit 11 continues to provide a negative voltage level to the input terminal 5 of the AND gate 2, holding the AND gate enabled as long as the periodic signal is concurrently provided to the input terminal 3 of the gate.

Refer now to FIG. 2, which is a detailed schematic diagram of the electronic latch circuit 1, which was illustrated in FIG. 1. The letters A through E found on FIG. 2 are indicative of the circuit points at which the waveshapes A through E, respectively, as shown in FIG. 3, are present in the circuit of FIG. 2. A signal means such as the source 13 provides a periodic signal which may be at a frequency on the order of 155 kilohertz to the signal input terminal 4 of the latch. This signal is provided in turn to the signal input terminal 3 of the AND gate 2 and in turn to the base electrode of a transistor 15 by way of a signal input network 14 which shifts the level of the periodic input signal to a predetermined operational level. The waveshape present at the base electrode of the transistor 15 is shown at waveshape A of FIG. 3. The collector electrode of the transistor 15 is connected by way of the primary winding of a transformer 16 to the control input terminal 5 of the AND gate. A first secondary winding of the transformer 16 is connected to the input of the amplifier 9. As was explained previously, the output of the amplifier 9 is connected to the input of the detector and charge storage circuit 11, which is comprised of a unidirectional current means, such as the diode 17, and a charge storage means, such as the capacitor 18. The second secondary winding of the transformer 16 is connected to a source of operating potential +*v* by way of a resistor 19. A capacitor 20 has one terminal connected to the common connection of the resistor 19 and the second secondary winding of the transformer 16. The other terminal of the capacitor 20 is connected to circuit ground. The amplifier 10 includes a transistor 21, which is connected in a common base configuration. The emitter electrode of the transistor 21 is connected to the second secondary winding of the transformer 16; and the collector electrode is connected to the primary winding of a transformer 22, which has the other terminal of the primary winding connected to the charge storage means 18 and the input terminal 5 of the AND gate 2. The secondary winding of the transformer 22 has one terminal connected to the signal output terminal 12 of the latch, and the other terminal connected to circuit ground.

Since the base electrode of the transistor 21 is connected to ground, and the emitter electrode of the transistor is coupled to the source +*v*, the transistor 21 operates in a class A mode and conducts a finite amount of DC current and serves as a discharge path for the capacitor 18. Consider now the operation of the latch circuit 1. A first signal means such as the signal source 13 provides a periodic input signal on the order of 155 KHZ to the signal input terminal 4 of the latch, and in turn to the signal input terminal 3 of the AND gate 2. The signal input network 14 shifts the level of the provided periodic signal such that a signal is applied to the base electrode of the transistor 15, which traverses from a −.5 volts to a +4 volt level as shown by waveshape A of FIG. 3. A second signal means such as the control input device 24 which, for example, may be a filp-flop momentarily applies a negative control pulse to the control input terminal 6 of the latch and in turn to the control terminal 5 of the AND gate 2 by way of the conducting diode 7. The control input pulse is illustrated at waveshape B of FIG. 3. At a time tO, the first pulse in the periodic pulse train is applied to the base electrode of the transistor 15. At this time, the control input terminal of the AND gate is at a zero volt level, and the transistor 15 therefore is providing no output signal. There is no input signal, therefore, applied to the input of the amplifier 9 or to the emitter electrode of the transistor 21. The transistor 21, therefore, remains conductive and supplies discharge current to the capacitor 18. The capacitor 18, therefore, being in a discharged condition provides no operating potential to the control terminal 5 of the AND gate 2 by way of the feedback path. At a time t1 a negative control pulse is applied to the control input 6 of the latch circuit, and in turn to the control input terminal 5 of the AND gate 2 by way of the conducting diode 7 (see waveshape B of FIG. 3). Since the periodic input signal is concurrently being applied to the base electrode of the transistor 15, the transistor 15 periodically becomes conductive and in response to the ringing action of the primary winding of the transformer 16, periodic pulses are applied to the amplifier 9 by way of the first secondary winding of the transformer 16 and to the emitter electrode of the transistor 21 by the second secondary winding of the transformer 16. In practice, the transformer 16 in a step-down transformer such that spurious signals sensed at the inputs of the gate are attenuated to a level below a level necessary to trigger following circuits. The amplifier 9 functions as a power amplifier to increase the input signal level to an amplitude and polarity sufficient to make the circuit 11 operative. In response to the negative portion of the output signal from the amplifier 9, the diode 17 becomes conductive, and the capacitor 18 charges to a predetermined negative signal level, for example −6 volts, which is sufficient to maintain the transistor 15 conductive (see waveshape C of FIG. 3). The transistor 21 has a periodic signal as shown at waveshape D of FIG. 3, applied to its emitter electrode at this time. The positive portion of this periodic signal maintains the transistor 21 in a conducting state; and during this time interval, the capacitor 18 is provided a discharge path. However, when the periodic signal reaches a selected negative level, for example −.5 volts, the transistor 21 is biased off, and there is no discharge path provided for the capacitor 18. When the transistor 21 becomes nonconductive, the transformer 22 rings and a periodic pulse is produced at the signal output terminal 12 of the latch. Since the transistor 21 is periodically pulsed "on", then "off" in response to the periodic signal applied to its emitter electrode, the capacitor 18 essentially remains at a −6 volt level since the amplifier 9 is continually providing periodic input pulses to the circuit 11 maintaining the capacitor in a charged condition. The signal provided at the signal output terminal 12 is illustrated by waveshape E of FIG. 3.

At a time t2, the periodic pulses provided to the signal input terminal 4 of the latch are momentarily interrupted, and the transistor 15 therefore provides, no periodic signal to the input of amplifier 9 or to the emitter electrode of the transistor 21. The transistor 21, as was explained previously, is conductive in the absence of input pulses as it operates in a Class A mode; and the capacitor 18 rapidly discharges to a zero volt level through the discharge path provided by the conducting transistor 21 (see waveshape C of FIG. 3). It is necessary that the capacitor 18 discharge at a relatively high rate since if it did not reach a zero volt level, and a signal input was concurrently applied to the signal input terminal 4 of the latch and there was no control input signal provided to the control input terminal 6, the latch circuit would then provide an output signal at the terminal 12, which is a non-safe condition. The discharge time is essentially determined by the capacitor 18 and the resistor 19. At time *t3*, the periodic input signals are once again applied to the signal input terminal 4 of the latch (see waveshape A of FIG. 3). The control input terminal 6 of the latch, however, is at a zero volt level, as there is no control pulse applied thereto. The capacitor 18 is discharged and is also at an essentially zero volt level, and there is zero volts, therefore, applied to the input terminal 5 of the AND gate by way of the feed-back path. The transistor 15, therefore, provides no periodic signals to the input of the amplifier 9 or the emitter electrode of transistor 21. At a time *t4*, a negative control pulse is applied to the control input terminal 6 of the latch; and since periodic signal inputs are also applied to the input terminal 4, the transistor 15 becomes operative and the amplifier 9 and the transistor 21 are once again provided periodic input signals. The capacitor 18, therefore, charges to the predetermined signal level (see waveshape C of FIG. 3); and this predetermined signal level is applied via the feedback path to the input terminal 5 of the AND gate, and the AND gate is then held in an enabled condition so long as the periodic input signals are concurrently applied to the signal input terminal 4. The operation of the circuit then functions as was previously explained.

In summary, an electronic latch circuit has been described having a signal input, a control input and a signal output. In response to periodic signals being applied to the signal input terminal concurrent with a control pulse being applied to the control input terminal, a periodic signal is then provided at the signal output terminal, and is continued to be provided until the signal applied to signal input terminal is interrupted.

I claim:

1. In combination:

gate means, having first and second inputs responsive to concurrently provided periodic and enable input signals, respectively, for providing an output signal;

charge storage means operative with said gate means and which charges to a predetermined signal level in response to the provision of said output signal, and including means for coupling said predetermined signal level to said second input as an enable signal; and means operative with said gate means and said charge storage means for providing either one of (a) an output signal path for said gate means, in response to the provision of said output signal, or (b) a discharge path for said charge storage means, in response to said output signal not being provided.

2. In a latch circuit, the combination comprising:

gate means having first and second inputs and an output at which an output signal is provided in response to the provision of periodic and enable signals to said first and second inputs, respectively;

charge storage means operative with said gate means and which charges to a predetermined signal level in response to the provision of said output signal, and including means for providing said predetermined signal level to the second input of said first-named means; and means operative with said gate means and said charge storage means for either one of providing (a) an output signal path for said gate means, in response to the provision of said output signal, or (b) a discharge path for said charge storage means, in response to said output signal not being provided.

3. In a latch circuit, the combination comprising:

a gate having first and second inputs and two outputs at which respective output signals are provided in response to the provision of first and second signals to said first and second inputs, respectively;

a charge storage means coupled to the first output and the second input of said gate, and which charges to a predetermined signal level in response to the provision of an output signal at the first output for providing said predetermined signal level to said second input; and means connected between the second output of said gate and said charge storage means for either one of providing (a) an output signal path for the output signal at the second output of said gate in response to the provision of said output signal at the second output of said gate, or (b) a discharge path for said charge storage means, in response to said output signal not being provided at the second output of said gate.

4. In an electronic latch circuit having a signal input, a control input, and an output at which an output signal is provided in response to the provision of first and second signals to said signal and control inputs, respectively, the combination comprising:

a gate having a first input connected to the signal input of said latch, and a second input connected to the control input of said latch, and an output at which a third signal is provided in response to the concurrent provision of the respective signals at the first and second inputs of said gate;

a charge storage means coupled to the second input and the output of said gate, and which charges to a predetermined signal level in response to the provision of said third signal, said predetermined signal level being of a level sufficient to enable said gate to provide said third signal so long as said first signal is concurrently provided to the first input of said gate; and third means operative with said gate and said charge storage means for providing either one of (a) an output signal path for said third signal to the output of said latch in response to the provision of said third signal, or (b) a discharge path for said charge storage means in response to said third signal not being provided.

5. The combination claimed in claim 4, including a unidirectional current means connected between the output of said gate and said charge storage means.

6. The combination claimed in claim 5, wherein said third means comprises a first amplifier.

7. The combination claimed in claim 6, including a second amplifier connected between said unidirectional current means and the output of said gate.

8. The combination claimed in claim 7, wherein said gate comprises an AND gate.

9. The combination claimed in claim 8, including a unidirectional current means connected between the control input of said latch and the second input of said gate.

10. In an electronic latch circuit having a signal input, a control input, and an output at which an output signal is provided in response to the provision of first and second signals to said signal and control inputs, respectively, the combination comprising:

a source of operating potential having first and second terminals;

a first transistor having a base, emitter, and collector electrodes, with said base electrode being connected to said signal input of said latch and either one of the emitter or collector electrodes being connected to the first terminal of said source;

a first transformer having a primary winding and first and second secondary windings with said primary winding having one terminal connected to the remaining one of the emitter or collector electrodes of said first transistor, and the remaining terminal of said primary winding being connected to said control input of said latch;

a second transistor having base, emitter and collector electrodes with either one of said emitter or collector electrodes being connected to one terminal of the second secondary winding of said first transformer with the remaining terminal of said second secondary winding being connected to the second terminal of said source;

a second transformer having a primary winding and a secondary winding with one terminal of said primary winding being connected to the remaining one of said emitter electrode or said collector electrode of said second transistor, and the remaining terminal of said primary winding being connected to the remaining terminal of the primary winding of said first transformer, and with one terminal of said secondary winding of said second transformer being connected to the output of said latch and the remaining terminal of said secondary winding of said second transformer being connected to the first terminal of said source; and a charge storage means having one terminal coupled to one terminal of the first secondary winding of said first transformer with the remaining terminal of said first secondary winding being coupled to the first terminal of said source, and the one terminal of said charge storage means being also coupled to the remaining terminal of said first and second transformers, the remaining terminal of said charge storage means being connected to the first terminal of said source.

11. The combination claimed in claim 10 with an amplifier connected between the one terminal of the first secondary winding of said first transformer and the one terminal of said charge storage means.

12. The combination claimed in claim 11 with a diode donnected between said amplifier and the one terminal of said charge storage means.

* * * * *